United States Patent [19]
Kidd et al.

[11] Patent Number: 6,015,223
[45] Date of Patent: Jan. 18, 2000

[54] OPTICAL SUBASSEMBLY FOR CENTER HIGH MOUNT STOP LAMP

[75] Inventors: Robert Andrew Kidd, Alexandria; Nova Kay Filbrun, Pendleton, both of Ind.

[73] Assignee: Guide Corporation, Anderson, Ind.

[21] Appl. No.: 09/032,502

[22] Filed: Feb. 26, 1998

[51] Int. Cl.⁷ .................................................. B60Q 1/00
[52] U.S. Cl. ........................ 362/503; 362/541; 362/545; 362/235; 362/499; 362/554; 362/559
[58] Field of Search ................................. 362/235, 237, 362/240, 244, 246, 340, 499, 554, 559, 543, 541, 503, 800

[56] References Cited

U.S. PATENT DOCUMENTS

| | | |
|---|---|---|
| 4,254,453 | 3/1981 | Mouyard et al. ........................ 362/240 |
| 4,345,308 | 8/1982 | Mouyard et al. ........................ 362/332 |
| 5,040,320 | 8/1991 | Reidinger .................................. 40/570 |
| 5,365,411 | 11/1994 | Rycroft et al. ............................ 362/20 |

*Primary Examiner*—Sandra O'Shea
*Assistant Examiner*—John A. Ward
*Attorney, Agent, or Firm*—Ice Miller Donadio & Ryan; Jay G. Taylor; Brian T. Ster

[57] ABSTRACT

A center high mount stoplamp is characterized by a linear array of light emitting diodes on a light carrier. A corresponding plurality of lens optics are carried on a lens carrier. A desired distance between the light emitting diodes and the lens optics is established by extensions from the lens carrier having opposing surfaces which interface with back and front sides of the light carrier.

8 Claims, 6 Drawing Sheets

OPTICAL SUBASSEMBLY FOR CENTER HIGH MOUNT STOP LAMP

TECHNICAL FIELD

The present invention is related to vehicular lighting.

BACKGROUND OF THE INVENTION

Center high mount stop lamps are provided on vehicles to enhance vehicle braking indication to following vehicles. Such stop lamps are particularly advantageous in situation where the conventional outboard brake lights are obscured by one or more vehicles interposed between the lead vehicle and a following vehicle. A lead vehicle's center high mount stop lamp is generally visible to a following vehicle operator through the passenger compartments of intermediate vehicles thus providing an indication to the following vehicle operator of preceding traffic conditions several car lengths ahead.

Until recently, standard incandescent bulbs have been the illumination source of choice for center high mount stop lamps. A typical center high mount stop lamp has one or more incandescent bulbs incorporated into a reflective housing adapted to emit light through a light transmissive cover. The light transmissive cover passes selected red wavelengths. Typically, an additional light diffuser is in the transmissive path or light diffusive optics are incorporated as part of the light transmissive cover. Such arrangements provide adequate diffusion of the light emitted such that off axis light output meets certain minimum illumination requirements.

Another type of illumination source becoming more prevalent in center high mount stop lamp applications is the light emitting diode (LED). Advantages of light emitting diodes in such application are low power consumption and long life. LEDs are characterized by a substantially more collimated light output than conventional incandescent bulbs. Additionally, light output equivalent to conventional incandescent bulbs requires a plurality of LEDs. Hence, to meet on and off axis illumination requirements, a large number of individual LEDs is generally required. Certain LED center high mount stop lamps employ a very large number of LEDs spanning a substantial portion of the cross car width which enhances the off axis illumination. Other LED center high mount stop lamps employ fewer LEDs by incorporating lens optics to control the spread of light to meet the illumination requirements. The latter LED center high mount stop lamp requires relatively tight tolerancing of the relationship between the LEDs and lensing optics which may be difficult to control in mass production. The former LED center high mount stop lamp is generally more forgiving of assembly variations due to the wider distribution and overall greater light output of the larger number of LEDs.

SUMMARY OF THE INVENTION

A lighting subassembly for application as an automotive center high mount stoplamp provides for a predetermined focal distance between a plurality of point light sources carried by a light source carrier and a corresponding plurality of lens optics carried by a lens carrier. The light source carrier and the lens carrier are assembled in an initial orientation and then into a final orientation establishing the predetermined focal distance between the light sources and the optics.

In accordance with one aspect of the present invention, the lens carrier includes an extension in the direction toward the light source carrier. The extension is characterized by first and second surfaces separated by and amount roughly equivalent to the thickness of the light source carrier. When the carriers are assembled into the final orientation, the light source carrier is trapped between the first and second surfaces which orientation corresponds to the predetermined focal distance between the light sources and the optics.

In one embodiment, the light source carrier is hingeably mounted to the lens carrier at the distal end of the extension. The light source carrier first receives a lip at the end of the extension through an appropriately sized aperture whereafter it is swung into the final position whereat movement toward and away from the lens carrier is impeded by respective opposing spaced surfaces.

In another embodiment, the light source carrier is slidably mounted to the lens carrier at the distal end of the extension. The light source carrier first receives a lip at the end of the extension through an appropriately sized aperture whereafter it is slid into the final position whereat movement toward and away from the lens carrier is impeded by respective opposing spaced surfaces.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
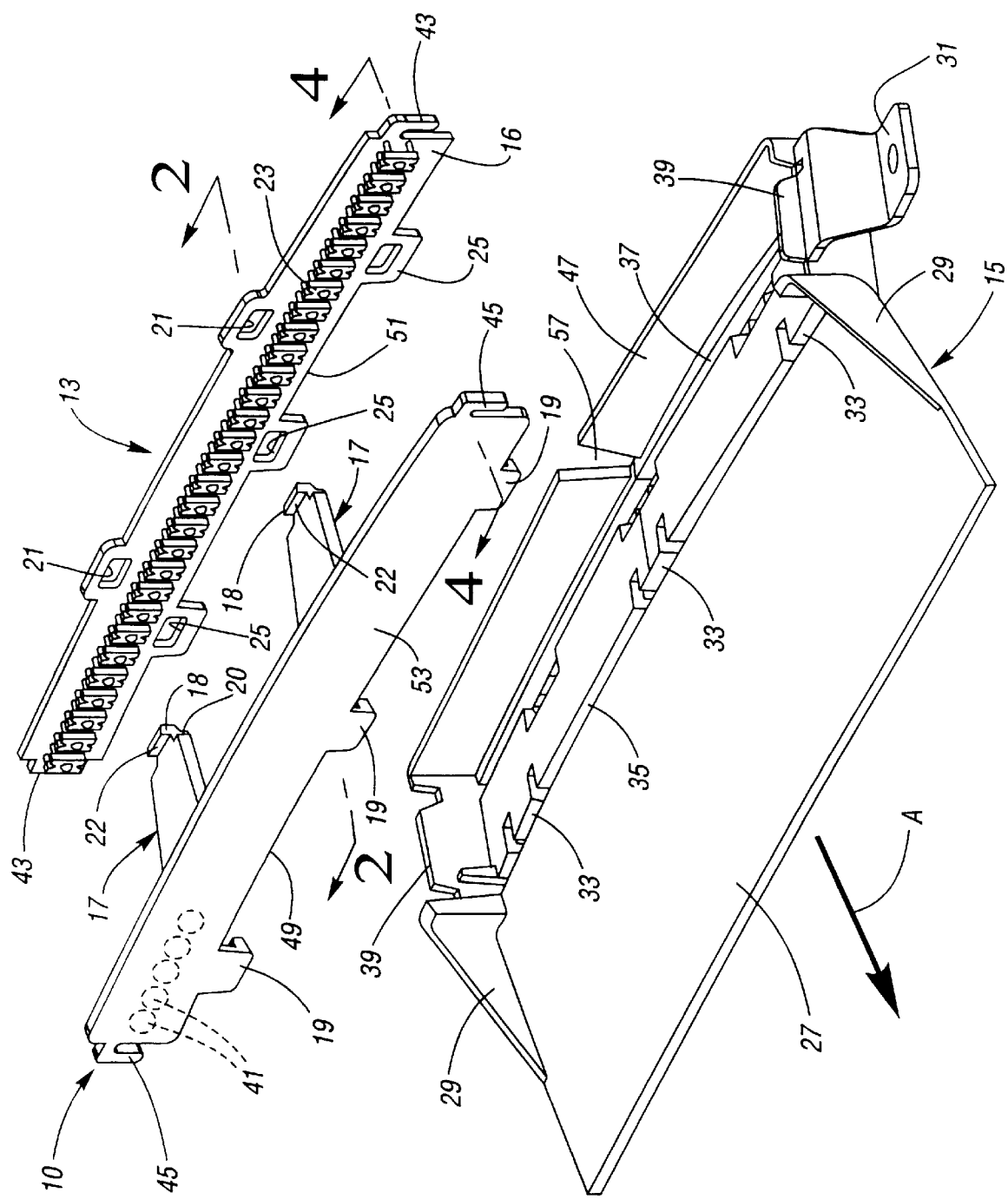
FIG. 1 is a disassembled isometric view of portions of a lighting assembly in accordance with one embodiment of the present invention.

With reference first to FIG. 1, a disassembled view of portions of a lighting assembly adapted for placement on the rear package shelf immediately adjacent the back glass in an automobile is shown. A light source carrier 13 provides structural support to a plurality of equally spaced point illumination sources which in the preferred embodiment comprise light emitting diodes (LEDs) 23. Each point light source is characterized by a radiation pattern with relatively high unidirectional on axis light output and relatively low off axis light output. The radiation pattern of each light source axis is substantially normal to the source carrier which itself is intended for installation in a vehicle (not shown) substantially normal to the vehicle's longitudinal (fore/aft) axis. The orientation of the longitudinal axis of the vehicle is labeled A in the figure with an arrow head designating the relative orientation of the rear of the vehicle. In other words, the light sources are arranged to shine with particularly inherent intensity toward the rear of the vehicle.

A corresponding plurality of individual lens optics 41 are supported by lens carrier 10 with focal centers having the same pitch as the plurality of LEDs 23. The purpose of the lens optics 41 is to controllably spread the substantially collimated light emitted by the LEDs 23 in the plane normal to the primary radiation axis. Hence, the lens optics 41 are diverging optics. An exemplary pattern of spread is substantially 20 degrees off axis in all directions in the described plane. Preferably, the lens optics 41 are molded into the lens carrier 10 through conventional injection molding apparatus. The lens optics 41 may take the form of conventional diverging lenses or, preferably, take the form of fresnel lenses. The lens carrier 10 with integrated lens optics 41 may be molded from polycarbonate or other suitable engineering plastic. The lens carrier 10 is also tinted either through surface coating application or preferably through tinting additives.

The lens carrier 10 and light source carrier 13 are substantially planar as illustrated though they may be formed slightly concave or convex without departing from the spirit of the invention. While in the most general case it is desirable that the LEDs' radiation axis and the lens optic's focal axis align, it may be desirable to provide offsets to manipulate the final dispersion pattern. Additionally, while the relative axial alignment between the LEDs and lens optics is important, the most critical tolerance is the axial distance between the LEDs and the lens optics or substantially the focal length of the lens optics. Hence, the separation between the lens optics and the LEDs must be repeatable in production and sustainable in application. When used herein, the term focal length corresponds to the desired distance between the light sources and the lens optics. This distance may or may not be the true focal distance of the optics.

A preferred embodiment of a lighting subassembly in accord with the present invention includes the light source carrier and lens carrier. Particularly, the lens carrier 10 has a pair of extensions 17 from the top thereof toward the light source carrier 13. The light source carrier 13 has apertures 21 corresponding in spacing to the extensions 17 also toward the top of the respective piece. The distal ends of each extension 17 have features to which the light source carrier 13 is initially assembled in a first orientation and then into a second orientation to thereby hold the spacing between the two carriers.

Figure 2A:
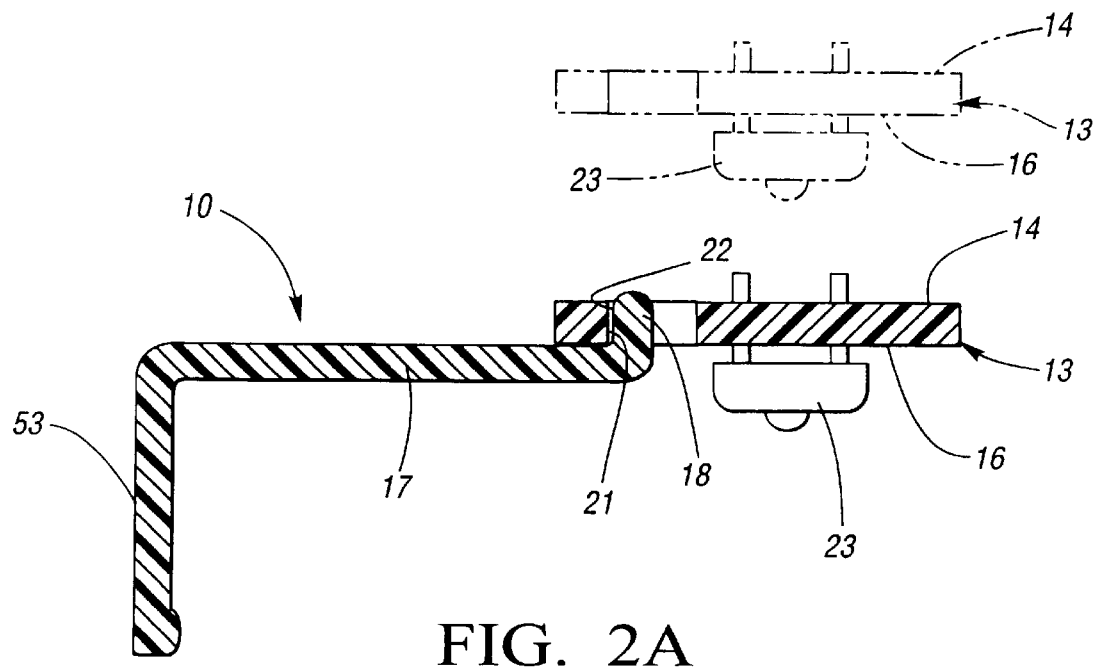
FIGS. 2A–2C are sectional views illustrating the assembly steps of lighting assembly taken along the direction labeled 2—2 in FIG. 1.
Figure 2B:
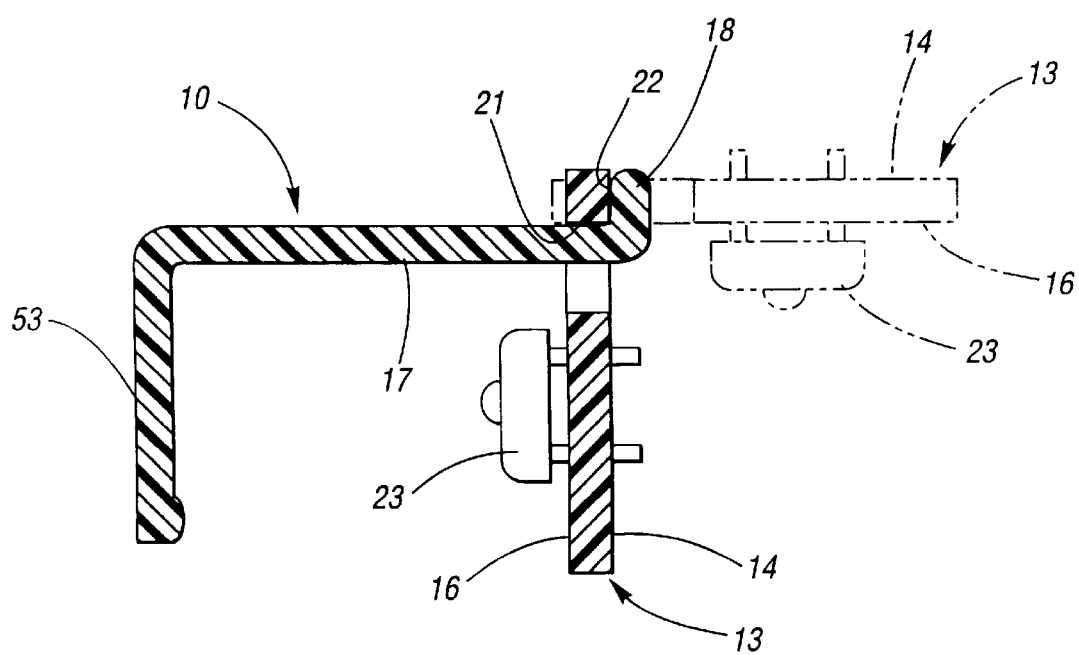
Figure 2C:
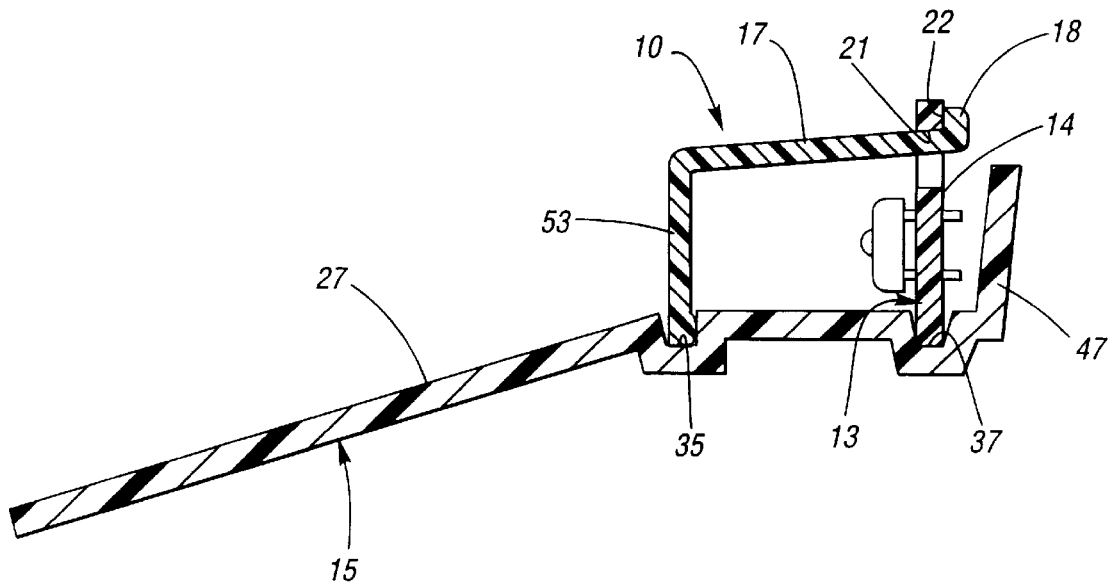
Figure 3:
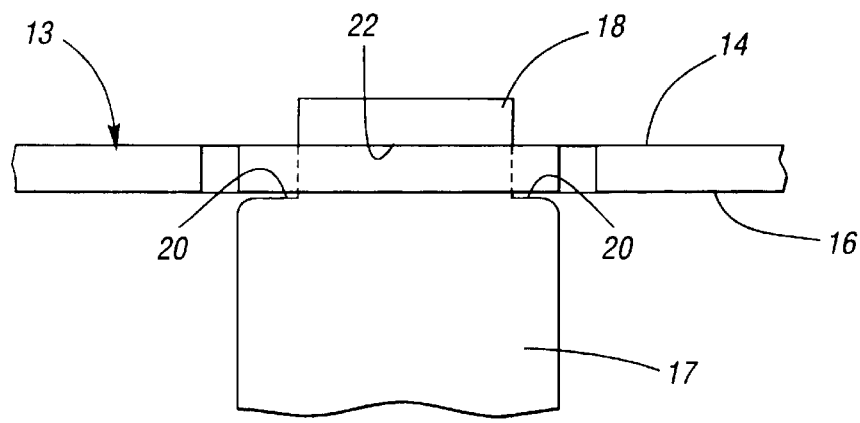
FIG. 3 is a partial plan view of the assembled lighting assembly of FIG. 1 showing one exemplary extension.
Figure 4:
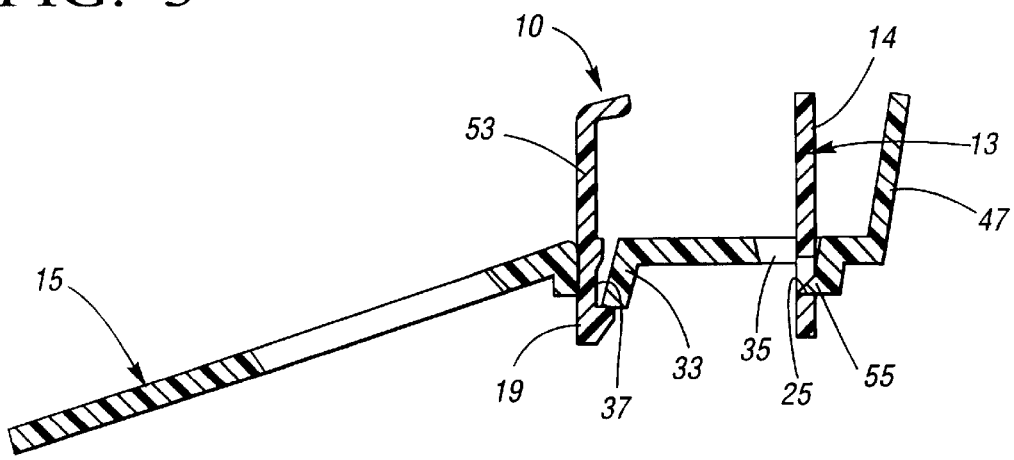
FIG. 4 is a sectional view of the assembled lighting assembly taken along the direction labeled 3—3 in FIG. 1.

A preferred form of the retention features is illustrated, in addition to the view of FIG. 1, in FIGS. 2A–2C which correspond substantially to assembly sequencing of the carriers 13 and 10 as viewed substantially in section through line 2—2 of FIG. 1. Initially, the lips 18 at the distal end of the extensions 17 are inserted through the apertures 21 of light source carrier 13. The apertures 21 is sized to first require insertion of the upturned portion of the lips 18 as shown in FIG. 2A with the carriers in a first relative orientation. The carrier 13 is then hinged toward the optical face 53 as in FIG. 2B. In this orientation, the back side 14 of carrier 13 is interfaced with the forward facing surfaces 22 of lips 18. Relative sizing of the apertures 21 and lips 18 prevent pull through of the lips 18. The front side 16 of carrier 13 interfaces with rear facing surface 20 formed on extensions 17. These surfaces 20 extend outside of aperture 21 boundaries and prevent further insertion of the extension 17 through the apertures 21. These aspects are most clearly illustrated by further reference to the plan view of FIG. 3. The light source carrier 13 is thereby hingeably attached to the lens carrier 10 through approximately 90 degrees of travel into a final aligned orientation. Further rotation of the carrier 13 is prevented by the surfaces 22 of lips 18 and surfaces 20 formed on extensions 17.

The bottoms 49 and 51 of the lens carrier 10 and light source carrier 13, respectively, are then secured to prevent relative movement by appropriate means. In the example at hand as illustrated in FIGS. 1 and 2C, the bottoms of the carriers are set into respective channels 37 and 35 of base 15. The bottom of light source carrier 13 has apertures 25 adapted to receive chips 55 formed at appropriate locations in the channel 37 of base 15. The bottom of lens carrier 10 has clips 19 received by clip receivers 33 formed at appropriate locations in the base. Other means of holding the bottoms together may include clip features between the tow carriers at the bottoms thereof; however, the described general connection to the base 15 secures the lighting subsassembly thereto in addition to preventing separation of the bottoms of the carriers.

Hanging tabs 43 and 45 at outboard ends of the respective carriers slide over sidewalls 39 as the subassembly of the carriers is mated to the base. These features serve to prevent significant lateral displacement of the subassembly in the base.

The base 15 further includes a backwall closeout 47 having a passage 57 for electrical or optical lines. Mounting ears 31 extend out from side walls 39 to provide mounting provisions for the assembly. A closeout to the vehicle backglass is also provided by closeout shelf 27 and closeout sides 29.

Figure 5:
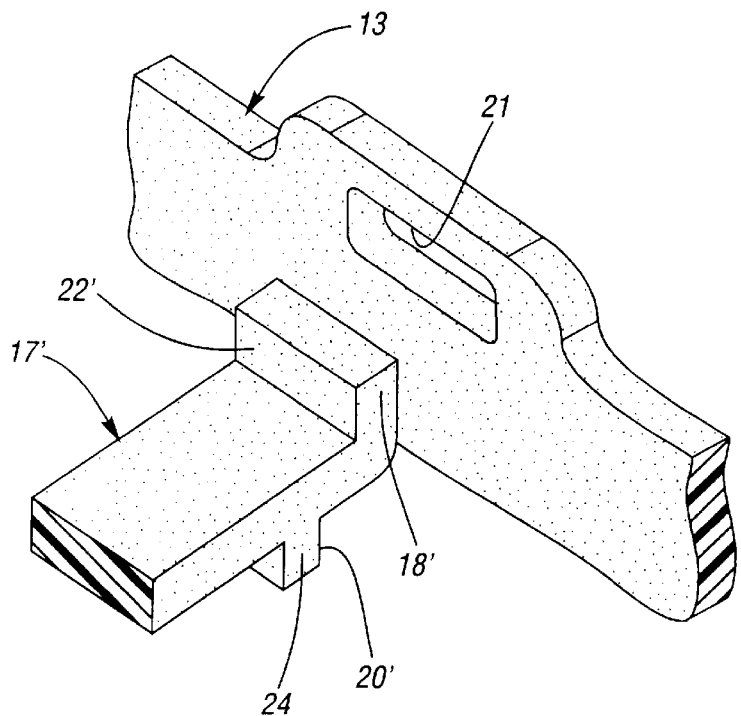
FIG. 5 is an isometric view of an alternative lens carrier to light source carrier interface in accordance with the present invention.
Figure 6:
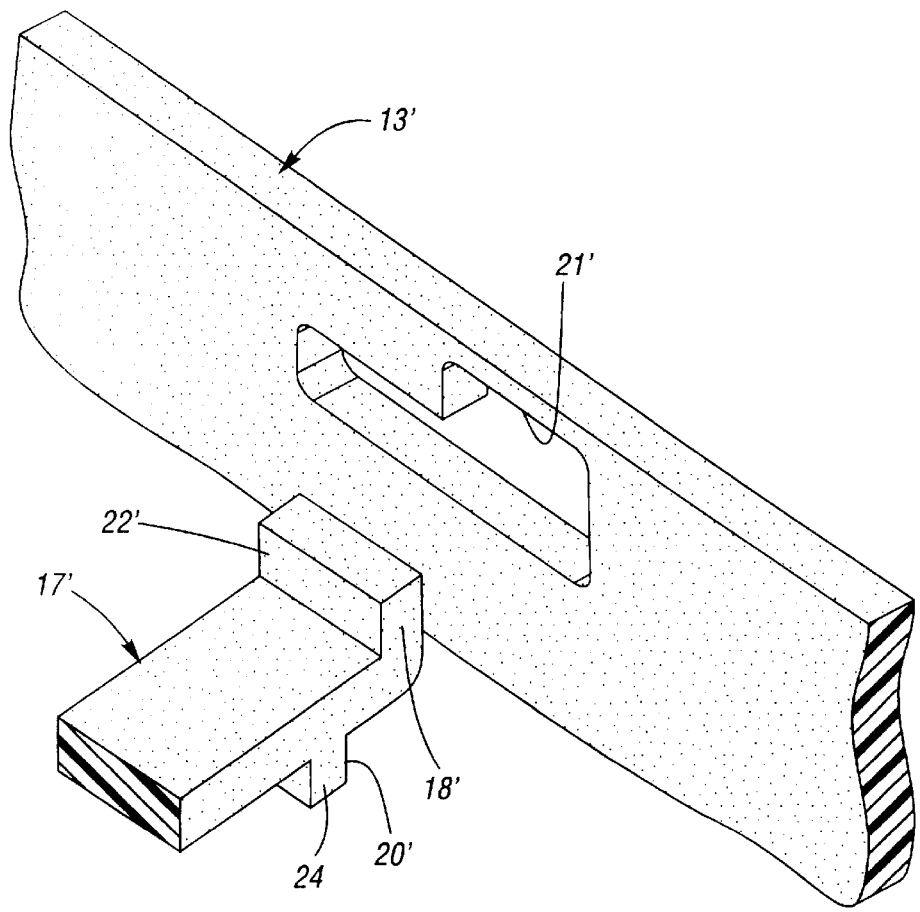
FIG. 6 is an isometric view of another alternative lens carrier to light source carrier interface in accordance with the present invention.
Figure 7:
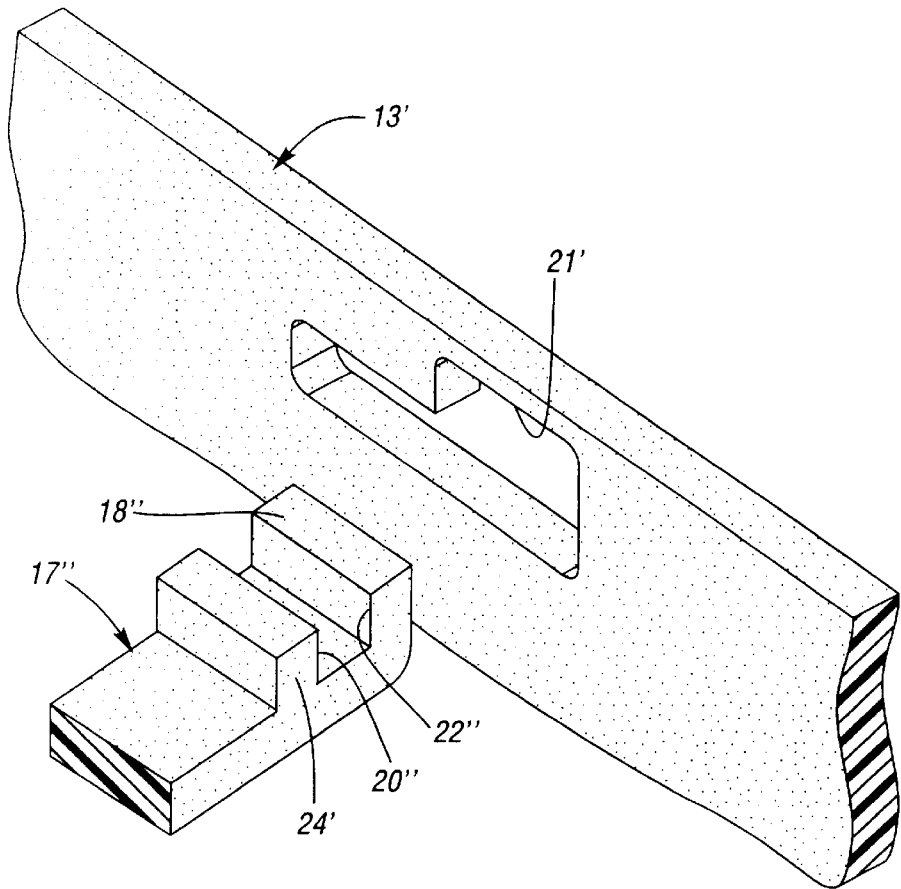
FIG. 7 is an isometric view of yet another alternative lens carrier to light source carrier interface in accordance with the present invention.

FIGS. 5–7 illustrate certain alternative structures for the retention interface of the light source carrier and lens carrier. In FIG. 5, extension 17' has an upturned lip 18' providing surface 22' similar to that previously described for interfacing with the back side of the light source carrier 13. The front side of the light source carrier 13 interfaces with surface 20' of fin 24 which extends from the bottom of extension 17'. The light source carrier 13 is similarly hingeably linked to the extension being installed in a first orientation, rotated through substantially 90 degrees to a second orientation.

FIG. 6 shows the same extension 17' as in FIG. 5. However, the light source carrier 13' has an aperture 21' allowing insertion of the extension through a large portion without having to rotate the carrier. The aperture is large enough to accept the lip 22' straight through until surface 20' of fin 24 abuts the front side of the light source carrier 13'. The carrier 13' is then slid laterally so that the back side of the carrier 13' now interfaces with the surface 22' of the lip 18'. Hence, the extension is inserted through the carrier 13' in a first orientation and slid to a second orientation which prevents fore aft movement between the lens carrier and light source carrier.

Yet another alternative is illustrated in FIG. 7. Here, extension 17" has lip 18" providing surface 22" for interface with the back side of carrier 13'. Fin 24' extends in the same direction as lip 18" from the top of extension 17". Fin 24' provides surface 20" to interface with the front side of carrier 13'. This arrangement also enables a slidable assembly in which the extension is inserted through a larger portion of aperture 21' followed by sliding the carrier 13' into a smaller area providing interfacing of the back and front sides of the carrier 13' with respective surfaces 22" and 20".

Figure 9:
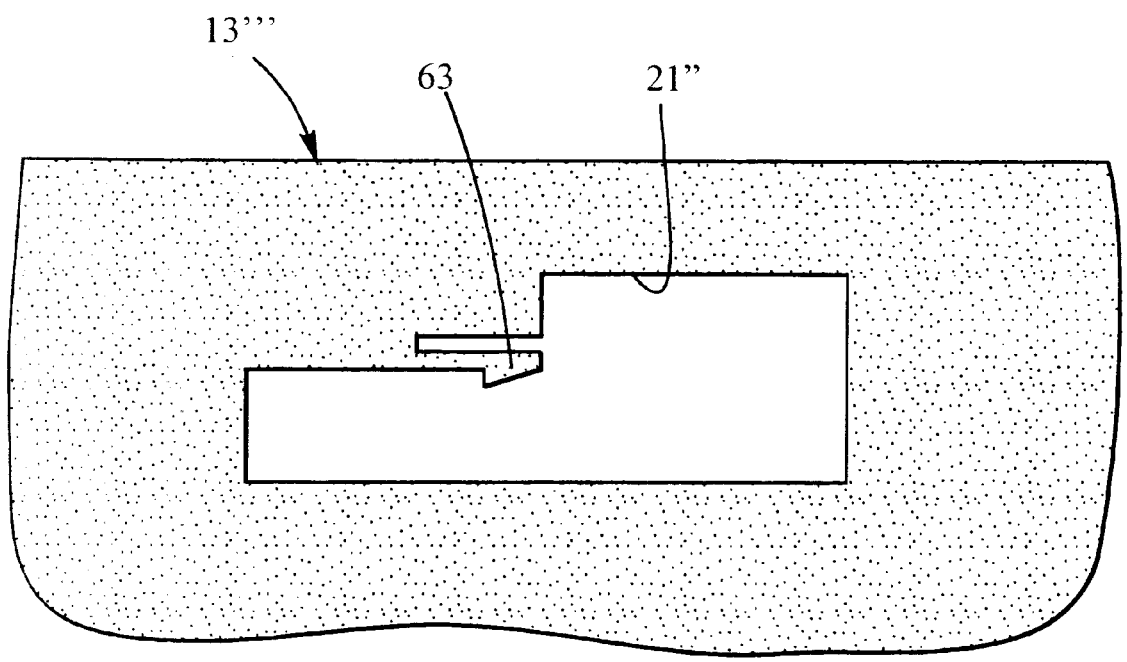
FIG. 9 illustrates an exemplary lateral retention mechanism for us in conjunction with the type of lens carrier to light source carrier interfaces generally illustrated in FIGS. 6 and 7.

With reference to FIG. 9, an alternative carrier 13''' and aperture 21" arrangement suitable for use with either alternative shown in FIG. 6 and 7 is illustrated. In this case, a retention clip 63 is formed at the lead in portion of the smaller portion of the aperture 21". When the respective extension is fully seated by sliding the carrier 13''', the clip 63 engages the trailing side edge of the extension to impede lateral separation of the carriers.

Figure 8:
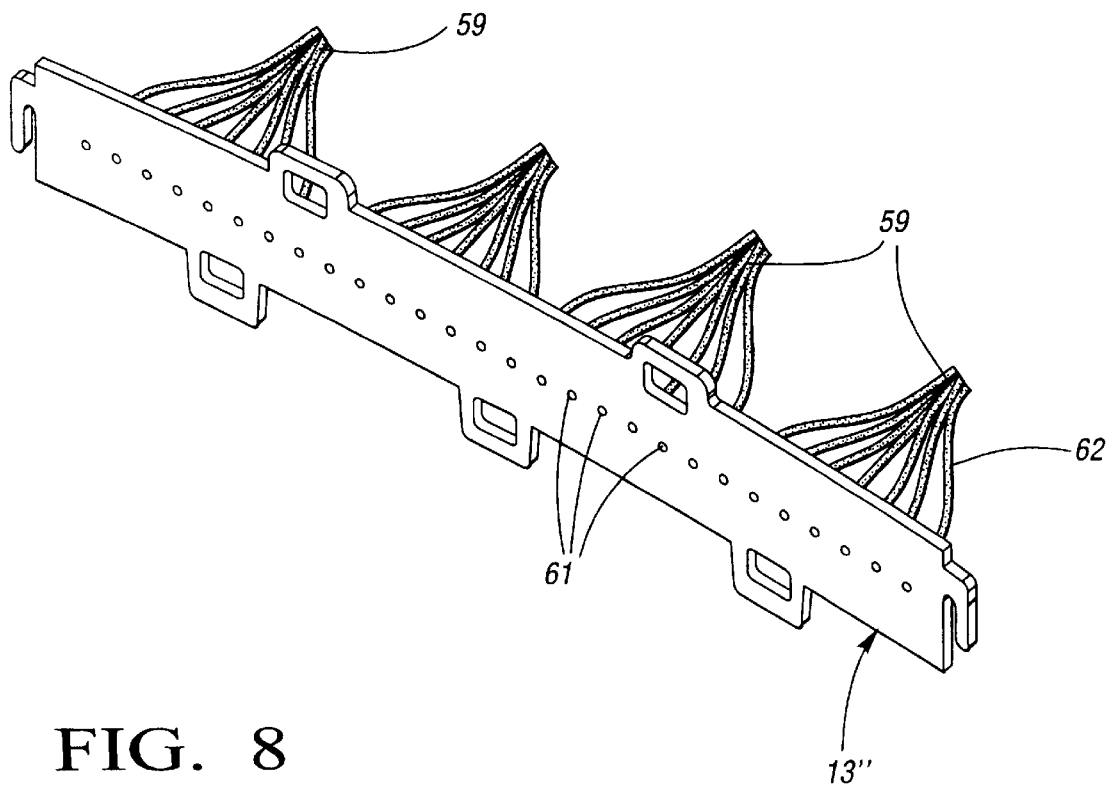
FIG. 8 is an isometric view of an alternative fiber optic light source carrier.

Finally, with reference to FIG. 8, an alternative light source carrier 13" is illustrated. The light source carrier 13" in this case has assembled thereto the light emitting end 61 of a plurality of individual fiber optic light pipes 62. The light pipes 62 are collected in bundles 59 which then terminate at an opposite end at a central light source.

While the present invention has been described with respect to certain preferred embodiments and alternatives, it is anticipated that modifications and other alternatives may be apparent to those having ordinary skill in the art. Therefore, the foregoing has been disclosed by way of non-limiting example and exposition of the invention which is to be limited only in accordance with the claims as appended hereto.

What is claimed is:

1. A lighting subassembly characterized by a predetermined focal distance between a planar array of point illumination sources and lens optics comprising:

a planar light source carrier for said array formed with an aperture between front and back sides thereof; and, a planar lens carrier including an extension substantially perpendicular to the plane of the lens carrier, said extension having a distal end having first and second opposing surfaces spaced along the axis of perpendicularity and substantially normal thereto, said light source carrier and extension adapted for insertion of one of the opposing surfaces through the aperture when the light source carrier and lens carrier share a first orientation and for trapping the light source carrier between the first and second opposing surfaces when the light source carrier and lens carrier share a second orientation.

2. A lighting assembly as claimed in claim 1 wherein said opposing surfaces are offset one from the other relative to the axis of perpendicularity.

3. A lighting assembly as claimed in claim 1 wherein said array of illumination point sources comprises light emitting diodes.

4. A lighting assembly as claimed in claim 1 wherein said array of illumination point sources comprises light emitting ends of fiber optic light pipes.

5. A lighting assembly as claimed in claim 1 wherein the light source carrier is hingeably assembled to the lens carrier from the first orientation to the second orientation.

6. A lighting assembly as claimed in claim 1 wherein the light source carrier is slidably assembled to the lens carrier from the first orientation to the second orientation.

7. A lighting subassembly characterized by a predetermined focal distance between an array of point illumination sources and lens optics comprising:

a lens carrier having lens optics;

a light source carrier having point illumination sources and hingeably assembled to the lens carrier in a first orientation and rotated to a second orientation, said second orientation corresponding to the predetermined focal distance; and, means for securing respective free swinging ends of said carriers in the second orientation.

8. A lighting assembly as claimed in claim 7 wherein said means for securing respective free swinging ends of said carriers in the desired orientation comprises a base portion for the lighting subassembly.

* * * * *